US006667361B2

(12) United States Patent
Masson et al.

(10) Patent No.: US 6,667,361 B2
(45) Date of Patent: Dec. 23, 2003

(54) RUBBER COMPOSITION USABLE IN THE VULCANIZED STATE AS A TIRE SAFETY SUPPORT AND SUCH A SUPPORT

(75) Inventors: Francois Masson, Greenville, SC (US); Francois Bataille, St-Amant-Tallende (FR); Serge Teisseyre, Clermont-Ferrrand (FR)

(73) Assignee: Michelin Recherche et Technique S.A., Grages-Paccot (CH)

( * ) Notice: Subject to any disclaimer, the term of this patent is extended or adjusted under 35 U.S.C. 154(b) by 91 days.

(21) Appl. No.: 09/759,049

(22) Filed: Jan. 12, 2001

(65) Prior Publication Data

US 2001/0052378 A1 Dec. 20, 2001

(30) Foreign Application Priority Data

Jan. 12, 2000 (FR) .............................. 00 00426

(51) Int. Cl.$^7$ ................................. C08K 3/34
(52) U.S. Cl. .................... 524/492; 524/493; 152/209 R
(58) Field of Search ................. 524/492, 493; 525/332.4, 333.1, 333.2, 333.3; 152/209 R

(56) References Cited

U.S. PATENT DOCUMENTS

| 3,842,111 A | | 10/1974 | Meyer-Simon et al. |
| 3,873,489 A | * | 3/1975 | Thurn et al. ......... 260/33.6 AQ |
| 3,978,103 A | | 8/1976 | Meyer-Simon et al. |
| 3,997,581 A | | 12/1976 | Pletka et al. |
| 4,002,594 A | | 1/1977 | Fetterman |
| 5,227,425 A | | 7/1993 | Rauline |
| 5,580,919 A | | 12/1996 | Agostini et al. |
| 5,583,245 A | | 12/1996 | Parker et al. |
| 5,663,396 A | | 9/1997 | Musleve et al. |
| 5,684,171 A | | 11/1997 | Wideman et al. |
| 5,684,172 A | | 11/1997 | Wideman et al. |
| 5,696,197 A | | 12/1997 | Smith et al. |
| 5,836,366 A | | 11/1998 | Muhlhoff |
| 5,871,597 A | * | 2/1999 | Vasseur .................. 152/209 R |
| 5,891,279 A | | 4/1999 | Lacour |
| 5,900,449 A | | 5/1999 | Custodero |

FOREIGN PATENT DOCUMENTS

| EP | 0501227 | 9/1992 |
| EP | 0722977 | 7/1996 |
| EP | 0796747 | 9/1997 |
| EP | 0810258 | 12/1997 |
| EP | 0824131 | 2/1998 |
| FR | 2512037 | 3/1983 |
| JP | 382601 | 8/1991 |
| WO | 9928376 | 6/1999 |

* cited by examiner

Primary Examiner—Edward J. Cain
Assistant Examiner—Katarzyna Wyrozebski Lee
(74) Attorney, Agent, or Firm—Baker Botts L.L.P.

(57) ABSTRACT

The present invention provides a rubber composition which when vulcanized may be used to form a safety support intended to be mounted on a wheel rim within a tire. The invention also is directed to such a support, capable of supporting a tread of the tire in the event of a drop in inflation pressure, and to a mounted assembly comprising this support. A rubber composition according to the invention comprises (phr: parts by weight per 100 parts of diene elastomer(s)): —natural rubber or synthetic polyisoprene in a quantity of greater than or equal to 60 phr, more than 60 phr of a reinforcing white filler, and from 3 to 8 phr of sulphur.

9 Claims, 10 Drawing Sheets

US 6,667,361 B2

RUBBER COMPOSITION USABLE IN THE VULCANIZED STATE AS A TIRE SAFETY SUPPORT AND SUCH A SUPPORT

BACKGROUND OF THE INVENTION

The present invention relates to a rubber composition that, in its vulcanized state, may be used in a safety support intended to be mounted on a wheel rim within a tire. The invention is also directed to the safety support, which is capable of supporting a tread of the tire in the event of a drop in inflation pressure and to a mounted assembly comprising the support.

Safety supports for vehicle tires are intended to be mounted on a rim within the tire for the purpose of supporting the tread of the tire in the event of a loss of inflation pressure. Such supports comprise a base which is intended to conform to the rim and a crown which is intended to come into contact with the tread in the event of loss of inflation pressure, but leaves a clearance relative thereto at nominal pressure.

Japanese patent specification JP-A-3/82601 discloses a safety support comprising a substantially cylindrical base and crown, which further comprises an annular body connecting the base and crown.

This annular body comprises a supporting element which is continuous circumferentially having:
  a plurality of partitions extending axially on each side of a circumferential median plane and distributed around the circumference of the support, and
  joining elements extending substantially circumferentially, each joining element connecting the respective ends of two adjacent partitions which are arranged on the same side of the support, said joining elements being arranged alternately in succession on each side of said partitions;
in which the partitions and joining elements are substantially rectilinear and the difference between the maximum and minimum values of the area of an axial section of the support element as a function of the azimuth, relative to the sum of these same areas, is preferably less than 0.3. As a consequence, as a function of the azimuth, the area of an axial section of the support element varies at most by a factor of two in order to ensure good uniformity of loading capacity and to limit vibration when running on the support.

This support is produced from a hard polymeric material, with the whole supporting element being designed to withstand compressive loads.

Such supports may be produced in conventional manner, for example by injection molding.

SUMMARY OF THE INVENTION

The object of the present invention is to provide a rubber composition, which in its vulcanized state can be used in a safety support intended to be mounted on a wheel rim inside a tire. The composition is such that it provides for improved weight reduction performance for the support over known supports at a comparable flat running service life.

The rubber composition according to the invention comprises (in parts by weight per 100 parts of diene elastomer(s)—"phr"):
  natural rubber or synthetic polyisoprene in an amount of greater than or equal to 60 phr,
  greater than 60 phr of a reinforcing white filler, and
  from 3 to 8 phr of sulphur.

Both the non-vulcanized and the vulcanized rubber compositions are contemplated in the present invention.

BRIEF DESCRIPTION OF THE DRAWINGS

The present invention can be better understood with reference to the appended drawings in which.

DETAILED DESCRIPTION OF THE INVENTION

Figure 1:
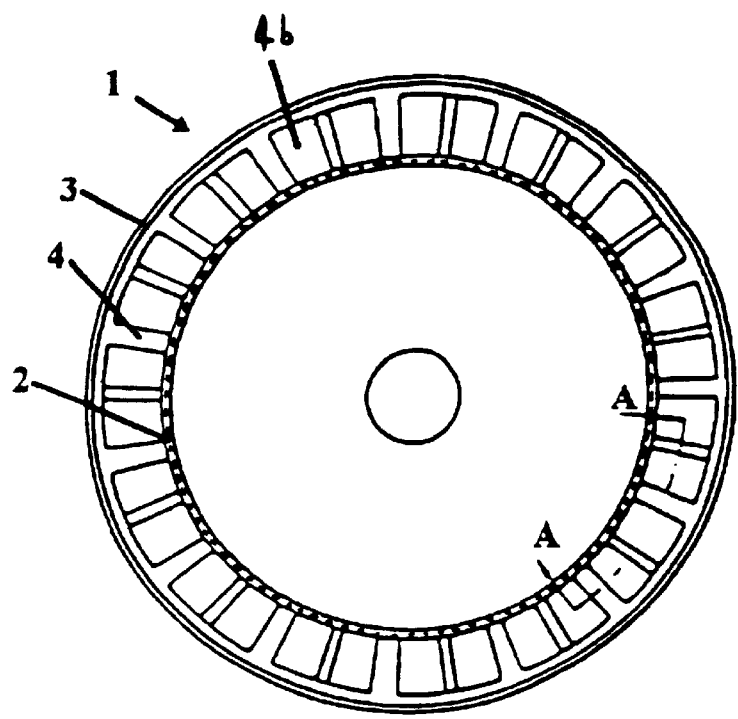
FIG. 1 is a side view of a safety support according to one embodiment of the invention.

In accordance with the invention, a diene elastomer is defined as an elastomer obtained at least in part (i.e. a homopolymer or copolymer) from diene monomers (conjugated or unconjugated monomers bearing two double carbon—carbon bonds). One or more elastomers may be used in the rubber compositions of the invention.

Preferably, the elastomers comprise at last one essentially unsaturated diene elastomer, which is a diene elastomer is a diene elastomer which is obtained at least in part from conjugated diene monomers having a content of moieties or units of diene origin (conjugated dienes) which is greater than 15% (mol %) and, includes:
  a) any homopolymer obtained by polymerization of a conjugated diene monomer, such as 1,3-butadiene, 2-methyl-1,3-butadiene (or isoprene), a 2,3-di(C1 to C5 alkyl)-1,3-butadiene, such as 2,3-dimethyl-1,3- butadiene, 2,3-diethyl-1,3-butadiene, 2-methyl-3-ethyl-1,3-butadiene, 2-methyl-3-isopropyl-1,3-butadiene, and phenyl-1,3-butadiene;

b) any copolymer obtained by copolymerization of one or more conjugated dienes with each other or with one or more vinyl aromatic compounds, such as styrene, ortho-, para- or meta-methylstyrene. Exemplary copolymers include butadiene-styrene copolymers and butadiene-isoprene copolymers.

According to one embodiment of the invention, the rubber composition further comprises a homopolymer obtained by polymerization of a conjugated diene monomer having 4 to 12 carbon atoms, or a copolymer obtained by copolymerization of one or more conjugated dienes with each other or with one or more vinyl aromatic compounds having from 8 to 20 carbon atoms, in a quantity of less than or equal to 40 phr.

A composition according to the invention may thus comprise a blend of natural rubber and a polybutadiene.

According to another embodiment of the invention, the composition comprises a single diene elastomer which is either natural rubber or synthetic polyisoprene.

A reinforcing white filler is defined as a white filler which is capable, on its own, without any intermediate means other than a white filler/elastomer bonding agent, of reinforcing a rubber composition intended for the manufacture of tires. A reinforcing white filler can replace the reinforcement action of a conventional filler of tire-grade carbon black.

Reinforcing white fillers include silica in an amount in the composition of greater than 60 phr, advantageously between 60 and 80 phr. More preferably, the silica is present in an amount between 65 and 75 phr.

Suitable silicas include any precipitated or pyrogenic silicas known to those skilled in the art, the BET or CTAB surface area values of which are both within a range from 50 $m^2/g$ to 200 $m^2/g$. Highly dispersible precipitated silicas are preferred.

"Highly dispersible silica" is defined as any silica having a very substantial ability to disagglomerate and to disperse in an elastomeric matrix, which can be observed in known manner by electron or optical microscopy on thin sections. Non-limiting examples of such highly dispersible silicas that may be used in the compositions of the invention include silicas BV 3370 and BV 3380 from Degussa, silicas Zeosil 1165 MP and 1115 MP from Rhodia, silica BXR 160 from PPG or silica Zeopol 8745 M from Huber.

Preferably, the BET or CTAB surface area values of the silica are both in the range of between 110 and 200 $m^2/g$ and, more preferably, between 140 and 195 $m^2/g$.

The physical state of the silica may be in the form of a powder, microbeads, granules, balls, etc.

As used herein, silica includes blends of different silicas. Silica may be used alone or in the presence of other white fillers. The CTAB specific surface area value is determined in accordance with the method of Standard NFT 45007 of November 1987. The BET specific surface area value is determined in accordance with the method of BRUNAUER, EMMETT and TELLER, which is described in "The Journal of the American Chemical Society, vol. 60, p. 309 (1938)" and corresponds to Standard NFT 45007 of November 1987.

Other non-limiting examples of reinforcing white fillers which may be used include:

aluminas (of the formula $Al_2O_3$), such as the high dispersibility aluminas, described in European Patent Specification EP-A-810 258 and aluminium hydroxides, such as those disclosed in international patent specification WO-A-99/28376.

The composition of the invention may also comprise carbon black in addition to the reinforcing white filler, for example in the form of a carbon/silica blend.

The rubber composition of the invention also comprises a reinforcing white filler/elastomer bonding agent (also known as a coupling agent), which provides an adequate chemical and/or physical bond (coupling) between the white filler and the elastomer(s), while facilitating dispersion of the white filler within the elastomeric matrix.

The bonding agent, which is at least bifunctional, has the simplified general formula "Y—T—X", in which:

Y represents a functional group ("Y" function) which is capable of bonding physically and/or chemically with the white filler, the bond being established, for example, between a silicon atom of the coupling agent and the hydroxyl (OH) surface groups of the filler (for example, surface silanols in the case of silica);

X represents a functional group ("X" function) which is capable of bonding physically and/or chemically with the elastomer, for example by means of a sulphur atom; and T represents a hydrocarbon group that links Y and X.

These bonding agents are not to be confused with simple agents for coating the filler. Such simple agents may comprise the Y function which is active with respect to the filler, but are devoid of the X function which is active with respect to the elastomer.

Bonding agents, of variable effectiveness, have been described in a large number of documents and are well-known to those skilled in the art. In fact, any bonding agent which is known to or likely to ensure effective bonding between the silica and diene elastomer in rubber compositions usable in tires, such as organosilanes, in particular polysulphurized alkoxysilanes or mercaptosilanes, may be used.

In particular polysulphurized alkoxysilanes are used, such as those described in U.S. Pat. Nos. 3,842,111, 3,873,489, 3,978,103, 3,997,581, 4,002,594 or, more recently, U.S. Pat. Nos. 5,580,919, 5,583,245, 5,663,396, 5,684,171, 5,684,172 and 5,696,197.

So-called "symmetrical" polysulphurized alkoxysilanes which satisfy the following general formula (I) are particularly suitable for the composition, without the definition below being limiting:

(I) Z—A—$S_n$—A—Z, in which:

n is an integer from 2 to 8 (preferably from 2 to 5);

A is a divalent hydrocarbon radical (preferably a $C_1$–$C_{18}$ alkylene or a $C_6$–$C_{12}$ arylene, more particularly a $C_1$–$C_{10}$ alkylene, in particular a $C_2$–$C_4$ alkylene, preferably propylene);

Z corresponds to one of the formulae below:

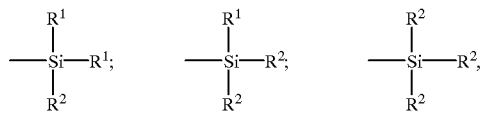

in which:

$R^1$, which may or may not be substituted, and may be identical or different, represents a $C_1$–$C_{18}$ alkyl, a $C_5$–$C_{18}$ cycloalkyl, or a $C_6$–$C_{18}$ aryl (preferably a $C_1$–$C_6$ alkyl, a cyclohexyl or phenyl, in particular a $C_1$–$C_4$ alkyl, more particularly methyl and/or ethyl);

$R^2$, which may or may not be substituted, and may be identical or different, represents a $C_1$–$C_{18}$ alkoxyl or $C_5$–$C_{18}$ cycloalkoxyl (preferably a $C_1$–$C_8$ alkoxyl or a $C_5$–$C_8$ cycloalkoxyl, more particularly methoxyl and/or ethoxyl).

Where mixtures of polysulphurized alkoxysilanes corresponding to formula (I) above, in particular conventional commercially available mixtures, are used, it will be understood that the mean value of "n" is a fractional number, preferably varying between 2 and 5.

Particular polysulphurized alkoxysilanes include polysulphides (in particular tetrasulphides) of bis(alkoxyl($C_1$–$C_4$) silylpropyl), particularly bis(trialkoxyl($C_1$–$C_4$)silylpropyl), more particularly polysulphides of bis(3-trimethoxysilylpropyl) or of bis(3-triethoxysilylpropyl). Bis(3-triethoxysilylpropyl) tetrasulphide, abbreviated TESPT, having the formula $[(C_2H_5O)_3Si(CH_2)_3S_2]_2$, is preferably used. TESPT is sold, for example by Degussa under the name Si69 (or X50S when supported at a content of 50 wt % on carbon black) or alternatively by Witco under the name Silquest A1289.

The person skilled in the art will be able to adjust the content of bonding agent in the compositions of the invention, according to the intended application, the elastomer(s) used and the quantity of reinforcing white filler used. The amount by weight of bonding agent in the rubber compositions of the invention are within a range from 2 to 15% relative to the mass of reinforcing white filler, preferably within a range from 5 to 12%.

The sulphur content in the composition according to the invention varies from 3 to 8 phr, preferably from 4 to 6 phr.

The rubber compositions according to the invention also contain, in addition to the elastomer(s), reinforcing filler, sulphur and one or more reinforcing white filler/elastomer bonding agent(s), various other constituents and additives usually used in rubber mixtures, such as plasticizers, pigments, antioxidants, vulcanization accelerators, extender oils, and/or one or more agents for coating the reinforcing white filler, such as alkoxysilanes, polyols, amines etc.

The rubber composition exhibits an M10 elasticity modulus at 10% deformation which is greater than 10 MPa, advantageously greater than 12 MPa and is preferably between 13 and 20 MPa.

The vulcanized rubber composition according to the invention is prepared using three successive preparation stages in accordance with a procedure familiar to those skilled in the art:

Stage 1 is a first thermomechanical working or kneading stage (sometimes known as the "non-productive" stage) carried out at an elevated temperature, up to a maximum temperature between 130° C. and 200° C., preferably between 145° C. and 185° C. During this stage all the necessary constituents including the bonding system discussed above, any optional filler coating agents or complementary processing agents and various other additives, with the exception of the vulcanization system, are introduced, for example, into an appropriate mixer, such as a conventional internal mixer;

Stage 2 is a second mechanical working stage (sometimes known as the "productive" stage) carried out at a lower temperature, typically below 120° C., for example between 60° C. and 100° C., during which the crosslinking or vulcanization system is incorporated. Such stages are described, for example, in patent specification EP-A-0 501 227.

Stage 3 is a third vulcanization stage of the mixture obtained on completion of the second stage.

A safety support according to the invention comprises a vulcanized rubber composition of the invention. This support comprises:

a substantially cylindrical base, intended to conform to the rim, a substantially cylindrical crown intended to come into contact with the tire tread in the event of a drop in inflation pressure, but to leave a clearance relative to said tread at nominal inflation pressure, and an annular body connecting the base to the crown, the body comprising a circumferentially continuous supporting element having a circumferential median plane, the supporting element comprising a plurality of partitions extending axially on each side of the circumferential median plane and distributed around the circumference of the support.

According to a first embodiment of a support according to the invention, the annular body also comprises joining elements extending substantially circumferentially on one of the sides of the support, each joining element connecting the respective ends of two adjacent partitions which are arranged on the side of the support, said joining elements being arranged alternately in succession on each side of said partitions.

In this first embodiment, the joining elements are mutually supported between two adjacent partitions by a rib extending from the crown to the base of the support such that the joining elements form a continuous joining wall in the form of a gusset all along the side of the support.

More precisely, the joining wall comprises a plurality of cells, each of which is delimited by two adjacent ribs, the bottom of each cell substantially exhibiting a dihedral shape, the ridge of which is formed by one of said partitions and the faces of which are respectively formed by the alternate joining elements.

According to a second embodiment of a support according to the invention, the annular body also comprises joining elements extending substantially circumferentially on both sides of the support, each joining element connecting the respective ends of two adjacent partitions which are arranged on the same side of the support, the joining elements being arranged alternately in succession on each side of said partitions.

In this second embodiment, the partitions are modified in their central portion relative to their lateral ends, so as to increase the buckling resistance of the annular body under radial load.

In fact, the central portion of the supporting element is moved away from the joining elements and may be destroyed during running on the support by the occurrence of a repeated buckling deformation. In the case of supports manufactured from an elastomeric material, such repeated buckling deformation during running initiates and propagates cracking on the side of the walls subjected to extension. On the other hand, in the case of supports manufactured from plastic materials, buckling deformation results in plastic deformation. Such irreversible deformation considerably reduces the stiffness and the loading capacity of the structure, progressively rendering it incapable of fulfilling its function.

The ratio between the thickness of the partitions in their central portion and in their lateral ends is greater than 1.1 and preferably greater than 1.5. The variation in thickness substantially increases the buckling resistance of the central portion of the partitions, which means that, for a given radial load, the thickness of the joining elements may be limited and the total weight of the support may be reduced.

From one lateral end to the other, these partitions exhibit at least one reversal and, preferably, three reversals in the direction of the curvature thereof.

These partitions exhibit, for example, a central portion extending substantially axially between two lateral portions, these lateral portions meeting the joining elements and forming an angle γ relative to the circumferential direction ranging from 20 to 40 degrees.

According to another embodiment of a support of the invention, the partitions exhibit, in their central zone, two portions extending substantially axially and offset circumferentially relative to each other, together with a third joining portion. The mean variation cc in orientation between the third joining portion and the two substantially axially oriented portions is preferably greater than 20 degrees.

Each joining element may be supported on only one side or on both sides of the supporting element by at least one wall extending substantially axially towards the outside of the annular body.

These axial walls are relatively insensitive to buckling because they are integral with the supporting element and relatively short. At a given constant width of the support, these axial walls make it possible to reduce the width of the supporting element and thus to increase the buckling resistance thereof.

In a preferred embodiment, a three-branched star structure is formed from each joining element with a supporting axial wall and the lateral ends of the two adjacent partitions, the axial width of one axial wall being less than or equal to half the axial width of the two adjacent partitions of the supporting element.

The supporting elements according to the invention may also comprise a web which is substantially cylindrical and coaxial with the support, such web being, for example, arranged radially at half height of the supporting element. This web is made from the same material as the rest of the annular body. When arranged at half height, the web allows the height of the partitions to be divided by two, thereby approximately quadrupling the limit buckling load.

In order to facilitate manufacture of the supports according to the invention, the various geometries of the supporting elements are adjusted so as to comprise no undercut portions obstructing axial demolding of the support.

Preferably, a mounted assembly according to the invention for a motor vehicle comprises a wheel rim, a tire mounted on the rim and the support according to the invention. The rim comprises on each of the peripheral edges thereof a rim seat intended to receive a bead of the tire, the rim therefore having two seats. The rim comprises between the two seats, a bearing surface and a mounting groove connecting the bearing surface to an axially internal lip of one of the seats, or first seat.

It will be noted that the flat structure which is imparted to said rim by the bearing surface is such that, during flat running, the entire width of the support bears the load, unlike "hollow" type rims.

The aforementioned characteristics of the present invention, as well as others, will be better understood on reading the following description of several embodiments of the invention, which are given by way of illustration and not of limitation in comparison with other examples not according to the invention.

The above-stated three embodiments relating to examples of architecture of the support according to the invention are moreover illustrated by the attached drawings, which are discussed in detail below.

In the following examples, flat running tests were performed on supports according to the invention and "control" supports which differ in regard to the composition of the rubber from which they are made and by the selected architecture for these supports.

Figure 2:
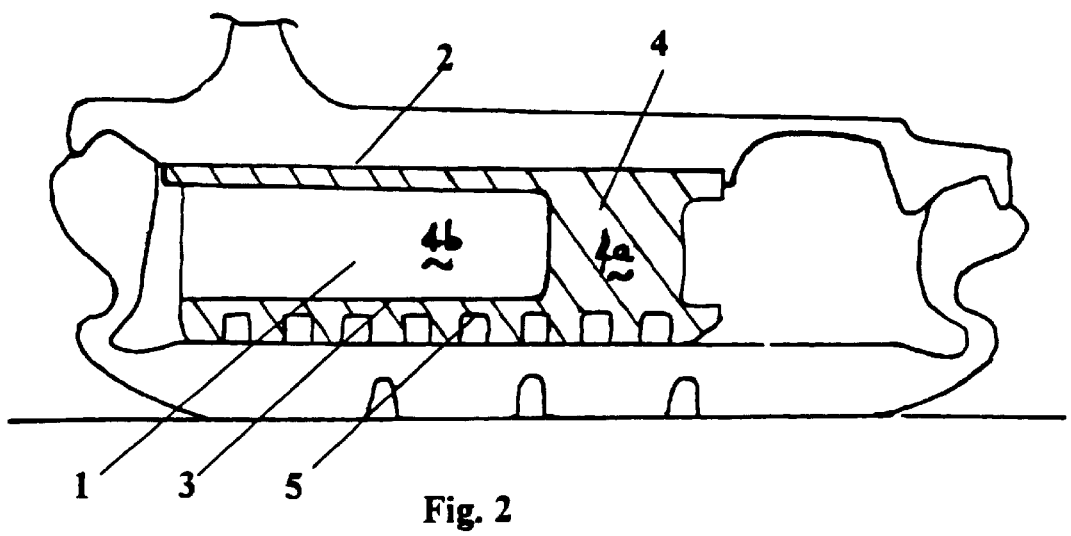
FIG. 2 is an axial section of a mounted assembly according to the invention, in which the support of FIG. 1 is mounted on a wheel rim and is in supporting position against a tire.

Referring to FIGS. 1 and 2, each of supports 1 essentially have three parts:

a base 2, of generally annular shape;

a substantially annular crown 3, optionally having longitudinal grooves 5 on the radially external wall thereof, and an annular body 4 connecting base 2 and crown 3.

FIG. 2 illustrates the function of support 1, namely supporting the tire tread in the event of severe loss of inflation pressure of the tire.

Each tested support was incorporated into a mounted assembly intended to equip a motor vehicle sold under the name "PEUGEOT 806".

The rim used for this mounted assembly was as is shown in FIG. 2, which is described above with reference to the preferred mounted assembly of the invention. (This rim is also described in detail in French patent specification FR-A-2 720 977.)

More precisely, the characteristic dimensions (tire width, tire diameter, rim diameter, respectively) of each mounted assembly which was tested are, in mm:

205-650-440.

The characteristic dimensions (width, internal diameter, height, respectively) in mm of each support which was tested are 135-440-50.

For each flat running test (controls and supports according to the invention), care was taken to ensure that the same relative crushing of the support in the radial direction thereof was obtained (this constant relative crushing being defined as the ratio of deflection to the height of the support).

The running conditions for each of the tests were as follows:

| | |
|---|---|
| load on wheel: | 530 kg; |
| running speed: | 100 km/h; |
| running temperature: | between 20° C. and 25° C. |
| running on a motorway type circuit. | |

CONTROL EXAMPLES

1) Control Example 1

A first control support which was incorporated into the above-described mounted assembly for the purposes of the flat running test was manufactured from a vulcanized rubber composition as defined below:

| | | |
|---|---|---|
| elastomer: | natural rubber | 100 phr; |
| reinforcing filler: | "ZEOSIL 1165 MP" silica | 54 phr |

(silica sold by Rhodia exhibiting BET and CTAB surface area values of at least 150 to 160 m$^2$/g);

| | | |
|---|---|---|
| coupling agent: | Si69/carbon black N330 | 8.5 phr* |
| "6PPD": | | 2 phr; |
| ZnO: | | 4 phr; |
| stearic acid: | | 1 phr; |

-continued

| | | |
|---|---|---|
| vulcanization accelerator: | "CBS": | 3 phr; |
| sulphur: | | 4.5 phr; |

*(4.25 phr Si69 and 4.25 phr carbon black N330);

where "6PPD" is N-(1,3-dimethylbutyl)-N'-phenyl-p-phenylenediamine and "CBS" is N-cyclohexylbenzothiazyl sulphenamide.

This first control support exhibits an M10 elasticity modulus of 9 MPa (M10 being the standard abbreviation for a secant elongation modulus obtained at a deformation of approx. 10%, at room temperature and on the third loading cycle, in accordance with Standard ISO 37-1977).

Figure 13:
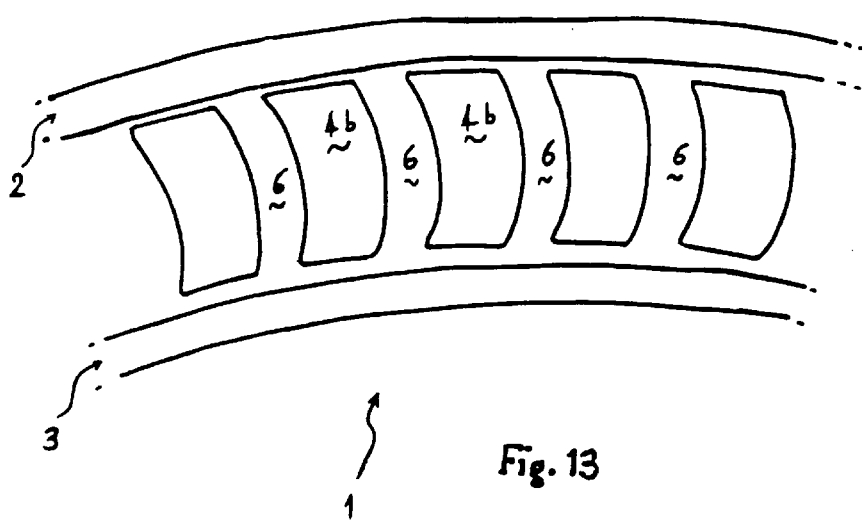
FIG. 13 is a perspective view illustrating a known support architecture.

This support is of a known architecture, which is shown in FIG. 13, in relation to FIGS. 1 and 2.

The section of FIG. 2 shows a first solid portion 4a of annular body 4 together with a second portion 4b having recesses (c.f. also FIG. 1) extending axially over substantially more than half of annular body 4 and opening on the outside in a substantially axial direction. Recesses 4b are distributed regularly around the entire circumference of annular body 4 and they define partitions 6, which provide a direct radial connection between crown 2 and base 3 of support 1.

This geometry has the advantage of subjecting partitions 6 to flexural rather than compressive loads when the partitions are crushed. Recesses 4b and, thus, partitions 6 are sufficient in number to ensure regular support during running on the support.

More precisely, this first control support 1 which was tested comprises, around its circumference, 38 partitions 6, each of which exhibits a thickness of 18 mm, which are spaced two by two at a distance of 38 mm.

Furthermore, base 2 and crown 3 exhibit a thickness of 7 mm and 8 mm, respectively. The annular body of first control support 1 exhibits, in the axial direction, a thickness of 35 mm.

The mass of this first control support is 8 kg.

The results of the running test conducted under the above-stated conditions for the mounted assembly comprising this first control support revealed a service life of greater than 200 km.

2) Control Example 2

A second control support which was incorporated into the above-described mounted assembly for the purposes of the flat running test was manufactured from a vulcanized rubber composition which differs from that of the first control support in that it comprises a blend of natural rubber (60 phr) and polybutadiene (40 phr). The architecture, dimensions and mass of this support were identical to those of said first control support.

This second control support exhibited substantially identical M10 modulus values relative to the first control support.

The results of the running test carried out under the above-stated conditions for this mounted assembly comprising this second control support also revealed a service life of greater than 200 km.

Testing was also performed on other control supports manufactured from control compositions according to control examples 1 or 2, but which exhibit an architecture as described below with reference to FIGS. 3 to 12. The results of the running test carried out under the above-stated conditions revealed a service life for these supports of less than 100 km.

EXAMPLES OF SUPPORTS ACCORDING TO THE INVENTION

A series of supports according to the invention was tested. All of the supports were manufactured from the same vulcanized rubber composition and exhibited the architectures illustrated in FIGS. 3 to 12, respectively.

For the sake of clarity in the present description, the tested support architectures are presented at the end of the description.

Each support according to the invention was manufactured using the vulcanized rubber composition as follows:

| | | |
|---|---|---|
| elastomer: | natural rubber | 100 phr; |
| reinforcing filler: | "ZEOSIL 1165 MP" silica | 70 phr; |
| coupling agent: | Si69/carbon black N330 | 11 phr;* |
| "6PPD": | | 2 phr; |
| ZnO: | | 4 phr; |
| stearic acid: | | 1 phr; |
| vulcanization accelerator: | "CBS": | 3 phr; |
| sulphur: | | 4.5 phr; |

*(5.5 phr Si69 and 5.5 phr carbon black N330);

Advantageously, each support according to the invention has a mass of 5 kg, which is approximately one third less than the 8 kg mass of each of the control supports. Thus, each support according to the invention exhibits a reduced mass relative to the said "control" supports.

Furthermore, the results of the running test carried out under the above-stated conditions for mounted assemblies comprising supports according to the invention also revealed a service life of greater than 200 km.

Each support according to the invention exhibits an M10 modulus of 16 MPa, which is higher than that of the "control" supports.

Moreover, the reinforcing white filler, (silica), in the above rubber composition used for each support according to the invention imparts to the composition improved uncured processing characteristics, as well as improved cured properties, such as cohesion, in addition to the above-mentioned rigidity.

Architectures Tested in Each Case for the Supports According to the Invention

Figure 3:
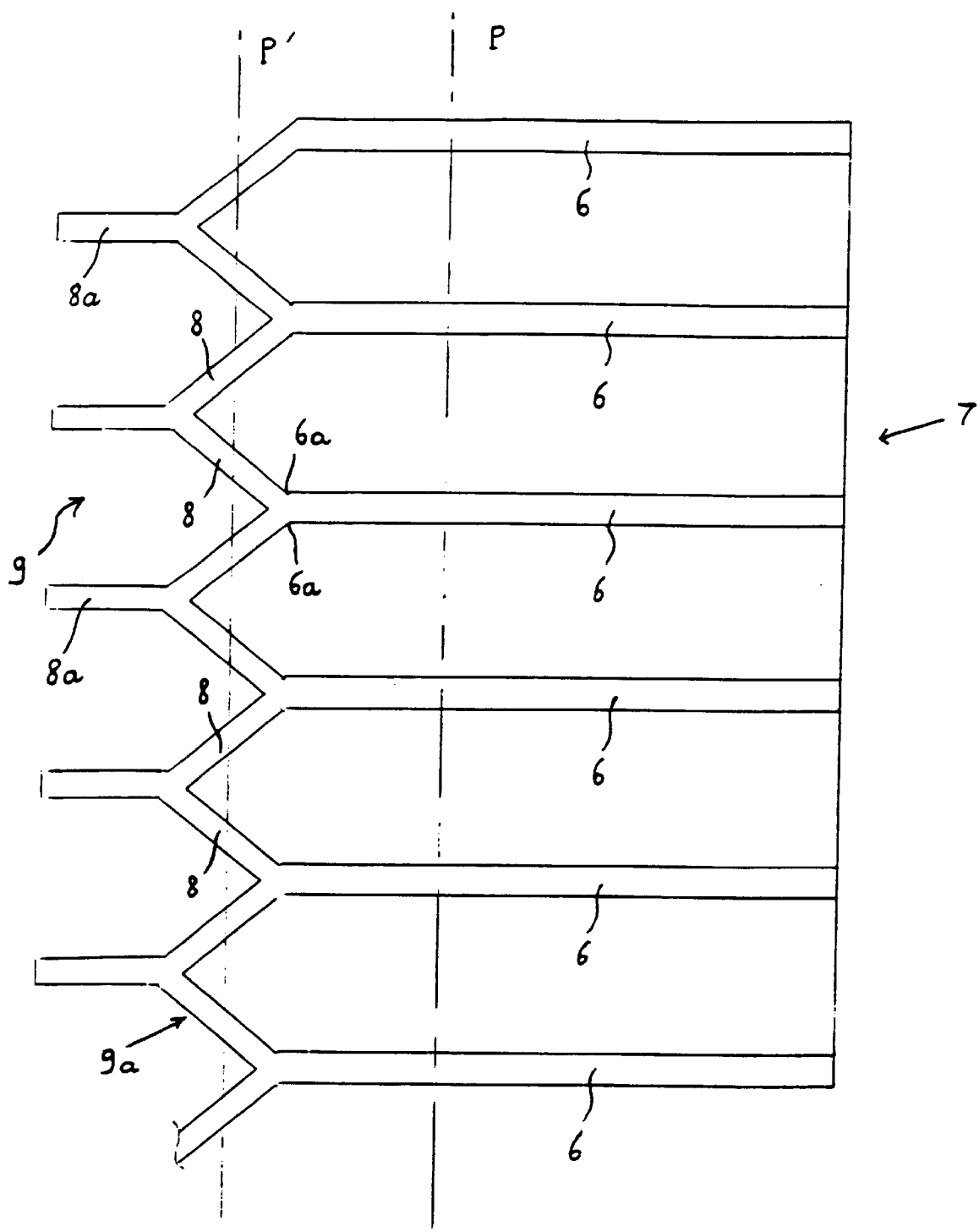
FIG. 3 is a section along line AA in FIG. 1 of a supporting element according to a first embodiment of the invention.

A first preferred architecture of the support according to the invention is illustrated in FIG. 3.

As has been stated above in general terms, with reference to FIGS. 1 and 2, a safety support 1 with the architecture depicted in FIG. 3 comprises base 2, crown 3 and annular body 4.

FIG. 3 shows a circumferentially continuous supporting element 7 of preferred support 1, the supporting element comprising a plurality of partitions 6 extending axially on each side of the circumferential median plane P of support 1 and being distributed around the circumference of support 1.

It may be seen in FIG. 3 that supporting element 7 comprises, on one of the sides of support 1, joining elements 8 extending substantially circumferentially. Each joining element 8 connects the respective ends 6a of two adjacent partitions 6 which are arranged on said side of support 1, the joining elements 8 being arranged alternately in succession on each side of partitions 6.

More precisely, joining elements 8 are mutually supported between two adjacent partitions 6 by a rib 8a extending from crown 3 to base 2 of support 1, such that joining elements 8 form a continuous joining wall 9 in the form of a gusset all along the side of support 1.

More precisely, joining wall 9 comprises a plurality of cells 9a, each delimited by two adjacent ribs 8a. The bottom of each cell 9a exhibits a substantially dihedral shape, the ridge of which is formed by one end 6a of partition 6 and the faces of which are respectively formed by alternate joining elements 8.

There are 40 partitions 6 of support 1 around the circumference of support 1 in this tested example. Each partition exhibits a thickness of 8 mm and they are 40 mm apart. As stated above, each support 1 that was tested exhibits a width of 135 mm, a diameter of 440 mm and a height of 50 mm.

Base 2 and crown 3 of support 1 exhibit a thickness of 6 mm and 7 mm, respectively.

The distance in the axial direction between a plane P' in FIG. 3, which is axially median for joining elements 8, and the respective free ends of ribs 8a, is 20 mm for this example.

Figure 4:
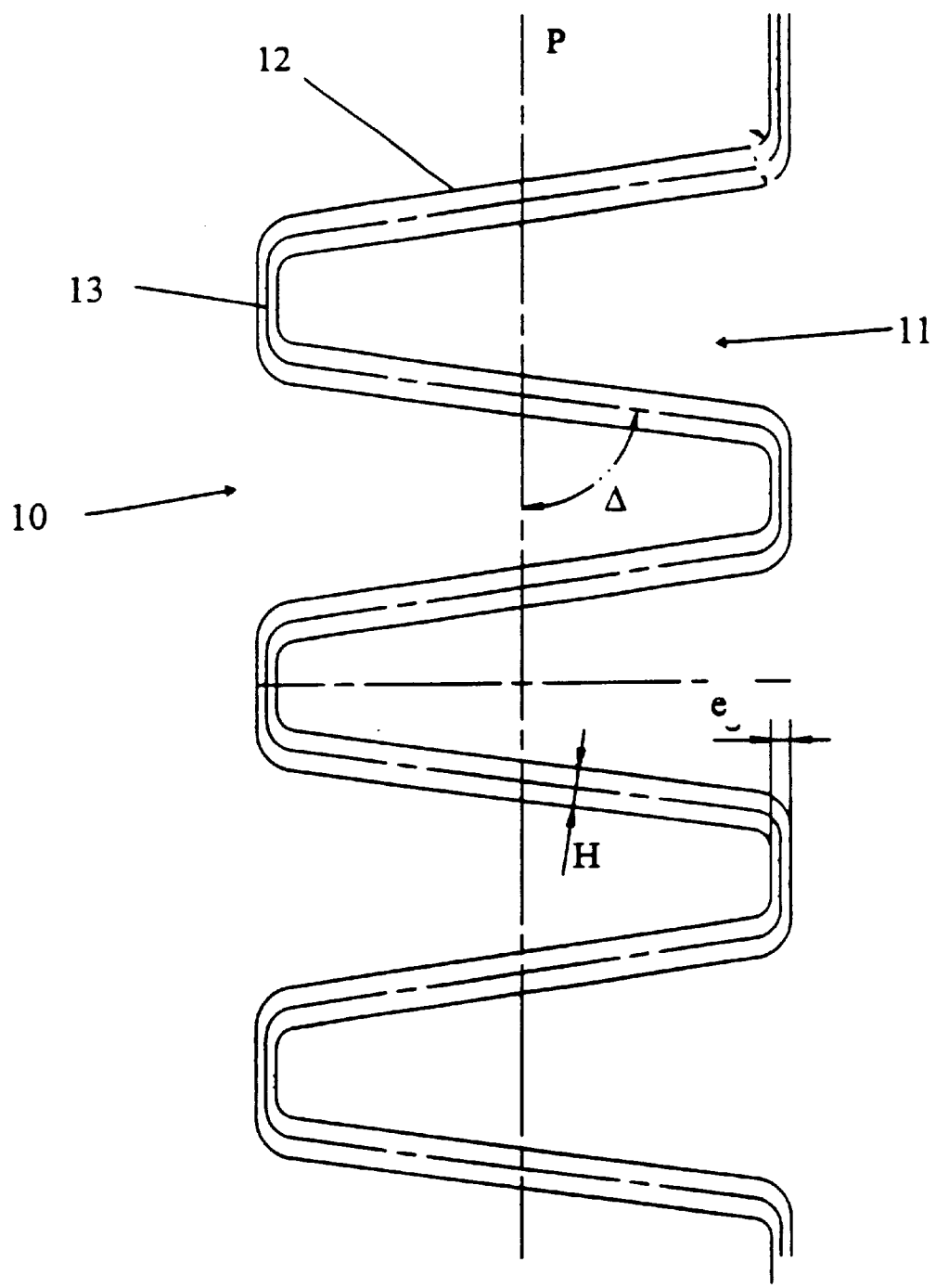
FIG. 4 is a section along line AA in FIG. 1 of a supporting element according to a second embodiment of the invention which comprises partitions connected together by alternate circumferential joining elements.
Figure 5:
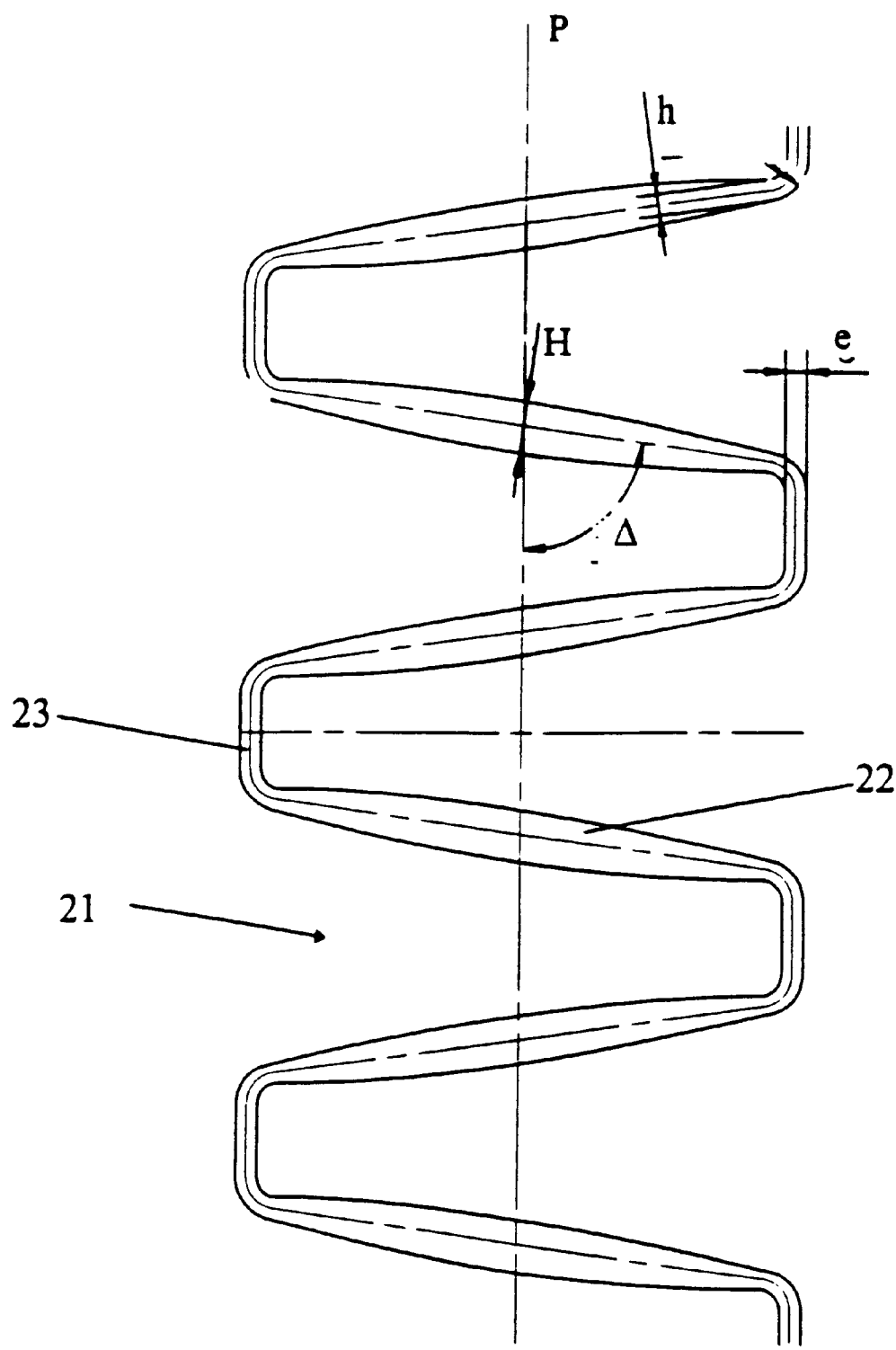
FIG. 5, similar to FIG. 4, is a section along line AA in FIG. 1 of a supporting element, the partitions of which are of variable thickness.

A second architecture of support 1 according to the invention is illustrated in FIG. 4, with FIGS. 5 to 12 illustrating variants of this second design (the structural elements analogous to those of FIG. 4 are hereinafter identified by reference numerals incremented by 10 for each Fig., starting from FIG. 5).

Supports 1 relating to these FIGS. 4 to 12 all comprise base 2, crown 3 and an annular body 10.

FIG. 4 depicts an annular body 10 consisting of a circumferentially continuous supporting element 11 which comprises a set of partitions 12 connected two by two by joining elements 13.

Partitions 12 extend laterally on each side of the circumferential median plane P of support 1 and they are regularly distributed around the circumference of support 1. They have an angle of inclination Δ, relative to the circumferential direction, which approaches 90 degrees. The thickness H thereof is constant. Moreover, two adjacent partitions 12 have an opposing angle of inclination relative to the axial direction.

Joining elements 13 have a thickness e and are oriented circumferentially. Each joining element 13 connects the respective ends of two adjacent partitions 12 which are arranged on the same side of support 1 (these two ends are the ones closest to each other). Joining elements 13 are thus arranged alternately in succession on each side of partitions 12.

It will be noted that, in order to facilitate manufacture of support 1 using axial demolding, supporting element 11 comprises no undercut elements.

FIG. 5 shows a variant embodiment of supporting element 21 (compare to supporting element 11 of FIG. 4).

Partitions 22 of supporting element 21 have a thickness H in their central portion which is greater than the thickness h thereof at their lateral ends. In this example, H is approximately twice the size of h.

This variation in thickness imparts very good buckling resistance to the central portions of partitions 22. The lateral ends are connected to joining elements 23 in continuous manner, which imparts good buckling resistance thereto.

It will be noted that a variation in thickness of as little as 10% may have appreciable effects for the purpose of postponing the onset of overload buckling.

Figure 6:
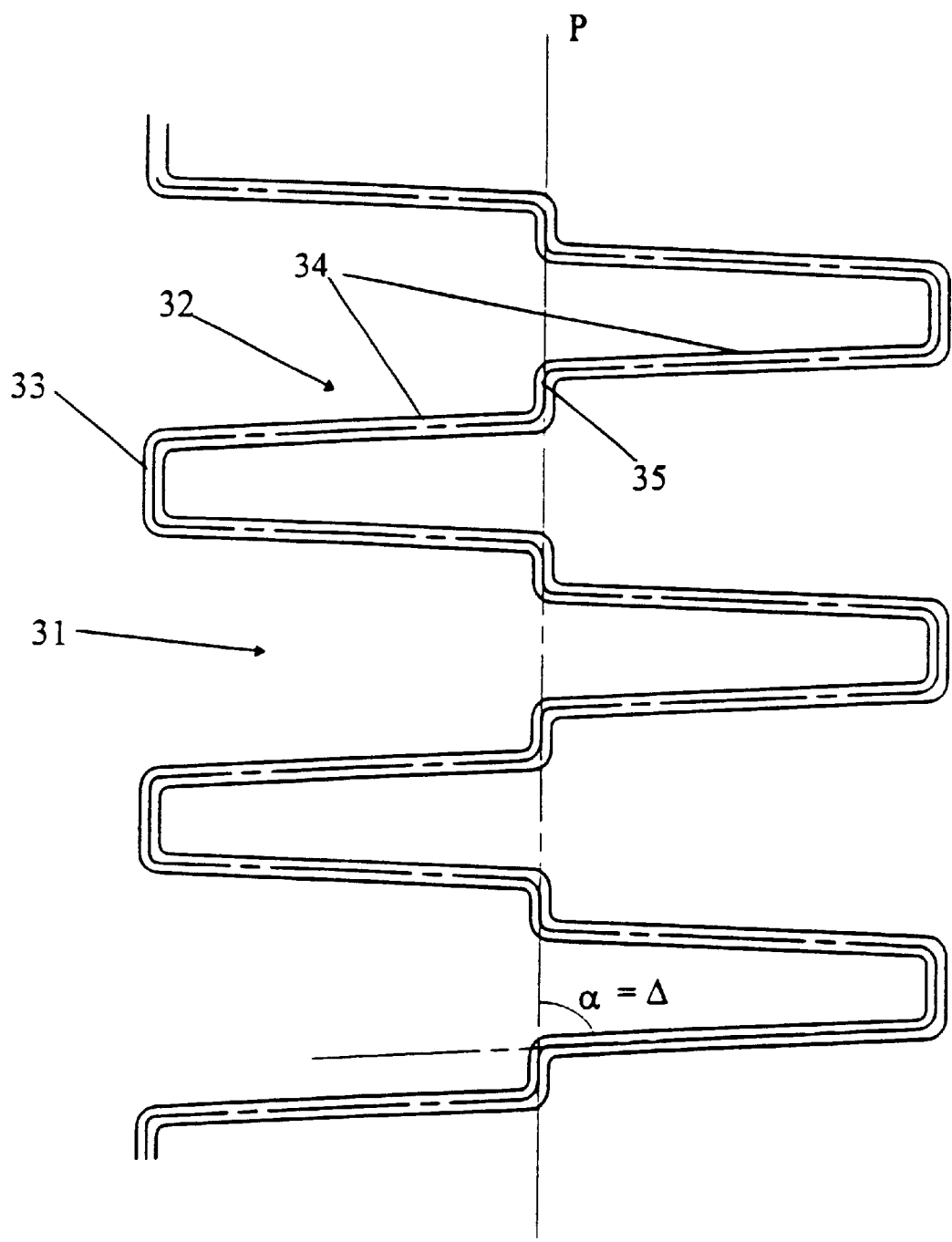
FIG. 6, similar to FIG. 4, is a section along line AA in FIG. 1 of a supporting element, the partitions of which comprise a central connecting portion which is oriented circumferentially.

FIG. 6 shows another variant embodiment, supporting element 31.

As above, supporting element 31 comprises partitions 32 which are connected by joining elements 33. Partitions 32 comprise two lateral portions 34 having the same angle of inclination Δ, relative to the circumferential direction, which are offset circumferentially and are connected in the central portion of supporting element 31 by a third portion 35 oriented substantially circumferentially.

The mean variation α in orientation between lateral portions 34 and central portion 35 is of the order of 80 degrees in this case. Since portions 35 are oriented circumferentially, angles α and Δ are equal.

This presence of this third central portion 35, which has a mean orientation differing greatly from that of the two lateral portions, increases the buckling resistance of the central portion of the partitions 32.

It will be noted that, in order to be effective, variation α must be greater than 20 degrees.

In this embodiment, partitions 32 comprise, from one lateral end to the other, one reversal in the direction of the curvature thereof.

Figure 7:
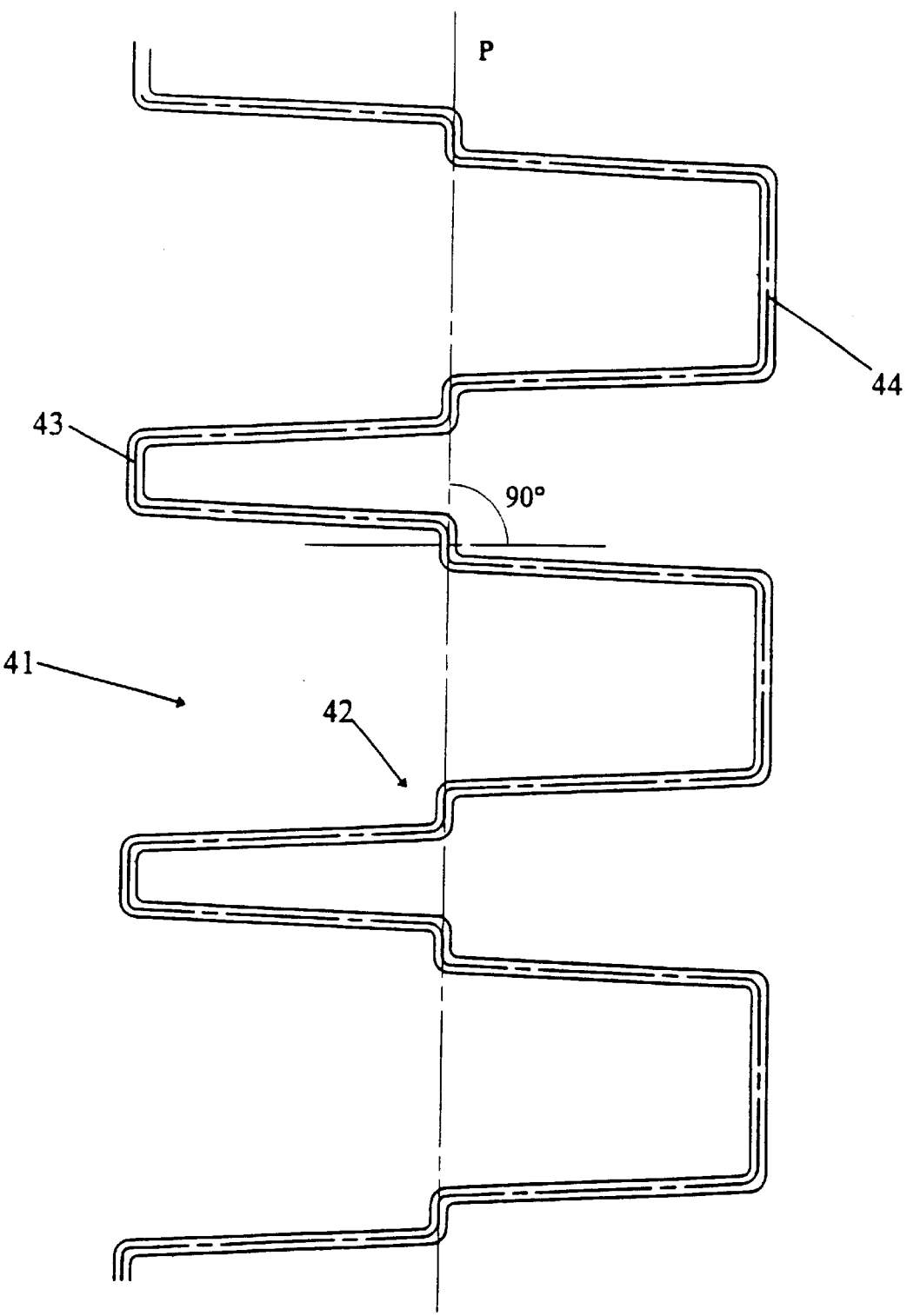
FIG. 7, similar to FIG. 4, is a section along line AA in FIG. 1 of a supporting element, the circumferential joining elements of which are of variable length.

FIG. 7 shows another variant embodiment, supporting element 41.

In this case, joining elements 43, which are arranged on one side of supporting element 41, have a circumferential length which is less than that of joining elements 44, which are arranged on the other side of supporting element 41.

It will be noted that the substantially doubled length of joining elements 44 increases the compressive stiffness of supporting element 41 on this side of the support 1. This latter side should be arranged towards the interior side of the vehicle, where the loads borne by support 1, while in operation, are the greatest.

Figure 8:
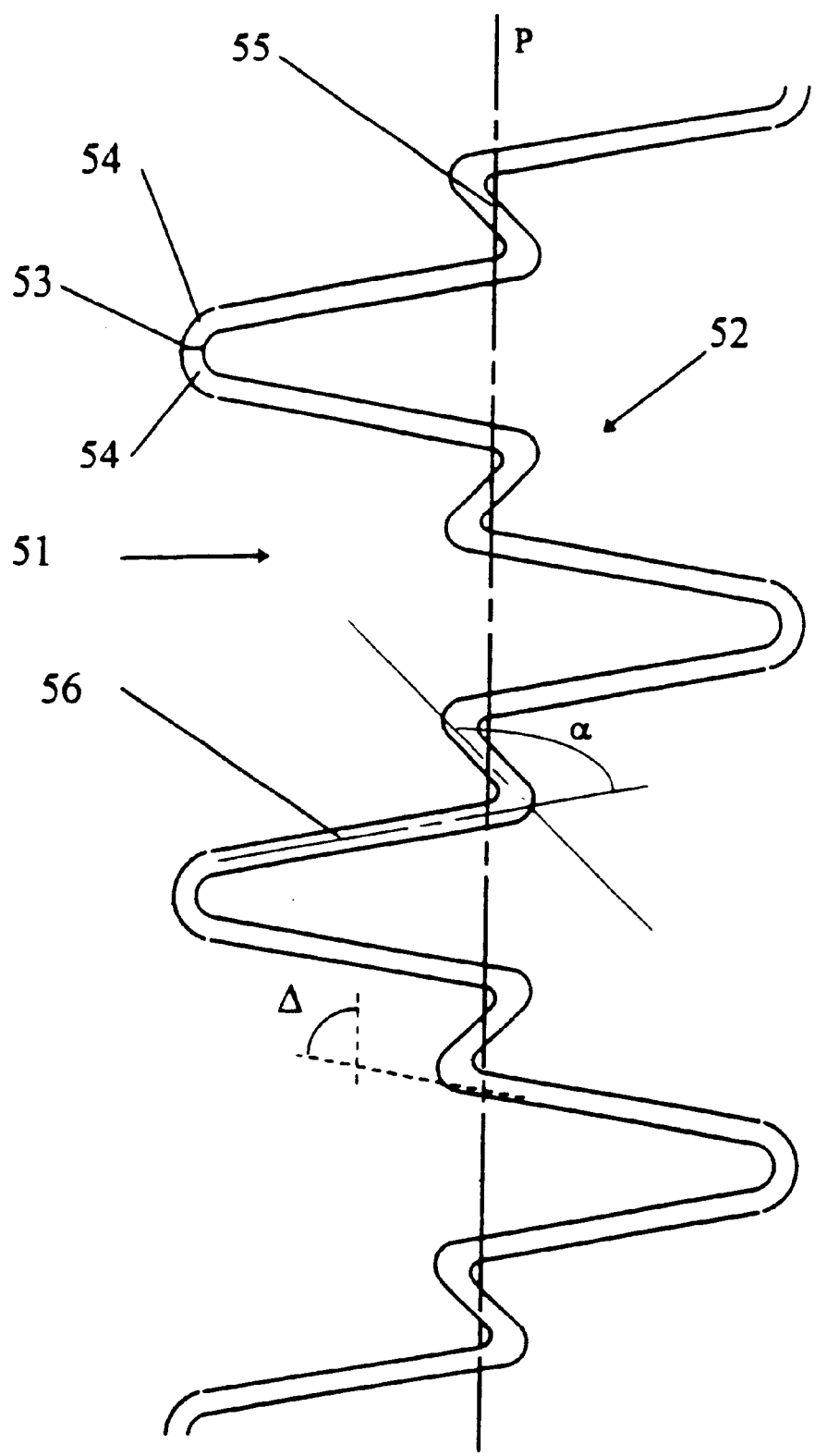
FIG. 8, similar to FIG. 4, is a section along line AA in FIG. 1 of a supporting element, the partitions of which exhibit three reversals of curvature across the width thereof.

FIG. 8 shows another variant embodiment, supporting element 51.

In this case, joining elements 53 are virtually reduced to the contact surface between two lateral ends 54 as an arc of a circle of partitions 52.

Partitions 52 also comprise a central connecting portion 55.

It will be noted that variation α in mean orientation between the two lateral portions 56 and central portion 55 is greater than 90 degrees and is of the order of 110 degrees, which increases the mean supporting density of supporting element 51 in the central portion thereof.

From one lateral end to the other, partitions 52 comprise three reversals in the direction of the curvature thereof.

Figure 9:
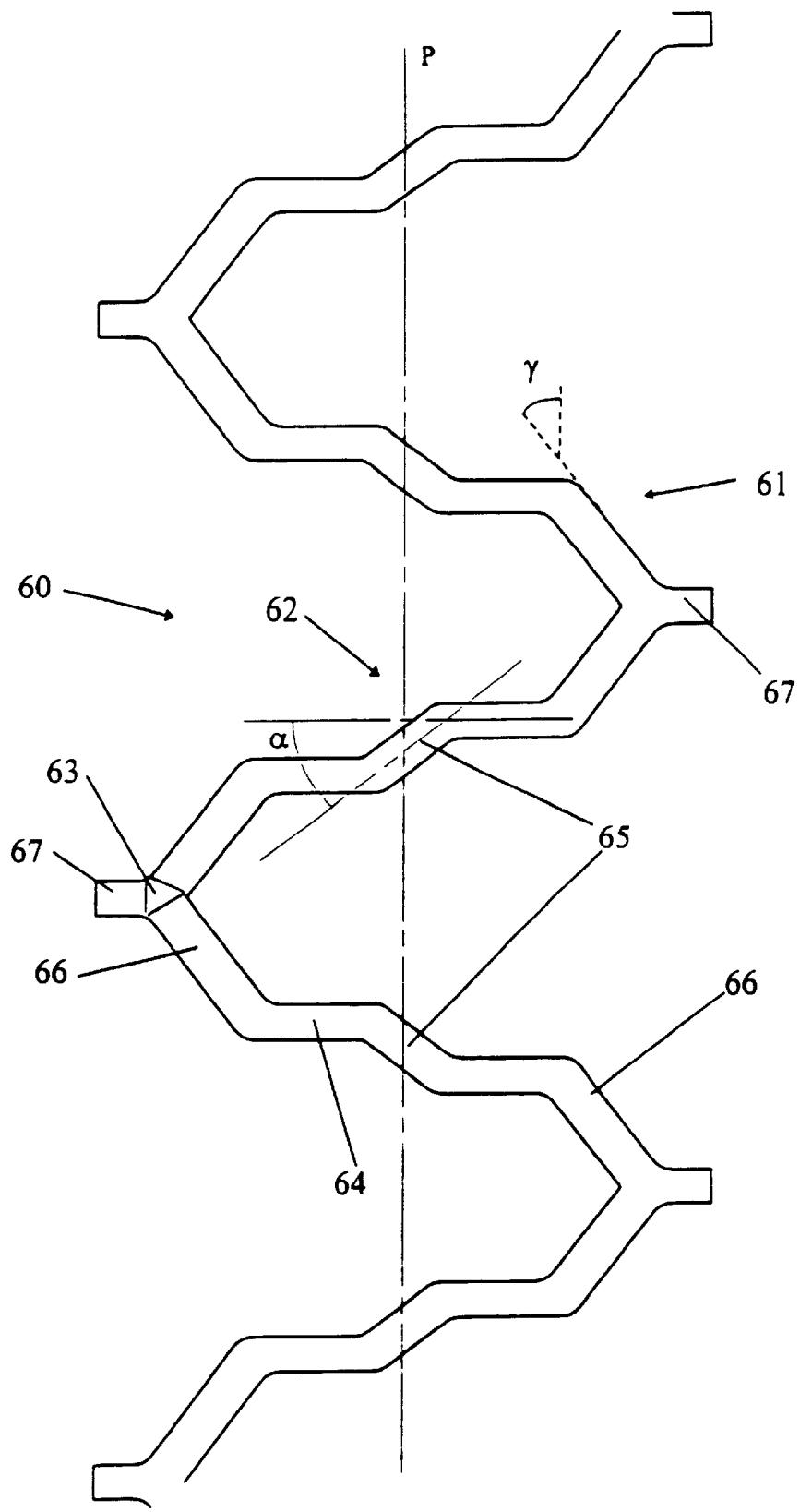
FIG. 9, similar to FIG. 4, is a section along line AA in FIG. 1 of an annular body including another embodiment of a supporting element, the partitions of which exhibit three reversals of curvature across the width thereof.

FIG. 9 shows another variant embodiment, supporting element 61, a variant similar to that shown in FIG. 8 with the following modifications.

Partitions 62 comprise rectilinear segments and exhibit three reversals in the direction of the curvature thereof. The partitions comprise two axially oriented lateral portions 64, which are connected, on the one hand, by central portion 65 and, on the other hand, to joining elements 63 by lateral ends 66 having a mean orientation y approaching 30 degrees, relative to the circumferential direction.

Mean variation α in orientation between the two axially oriented portions 64 of partitions 62 and central joining portion 65 is of the order of 40 degrees.

Joining elements 63 may be defined as elements of a substantially triangular cross-section, which are arranged between two adjacent lateral ends 66.

On both sides of supporting element 61, annular body 60 comprises a series of substantially axially oriented walls 67 which extend each joining element 63 towards the outside of support 1. As may be seen in FIG. 9, a three-branched star, which is highly resistant to buckling, is formed where each joining element 63, adjacent lateral ends 66 and axial wall 67 meet.

Figure 10:
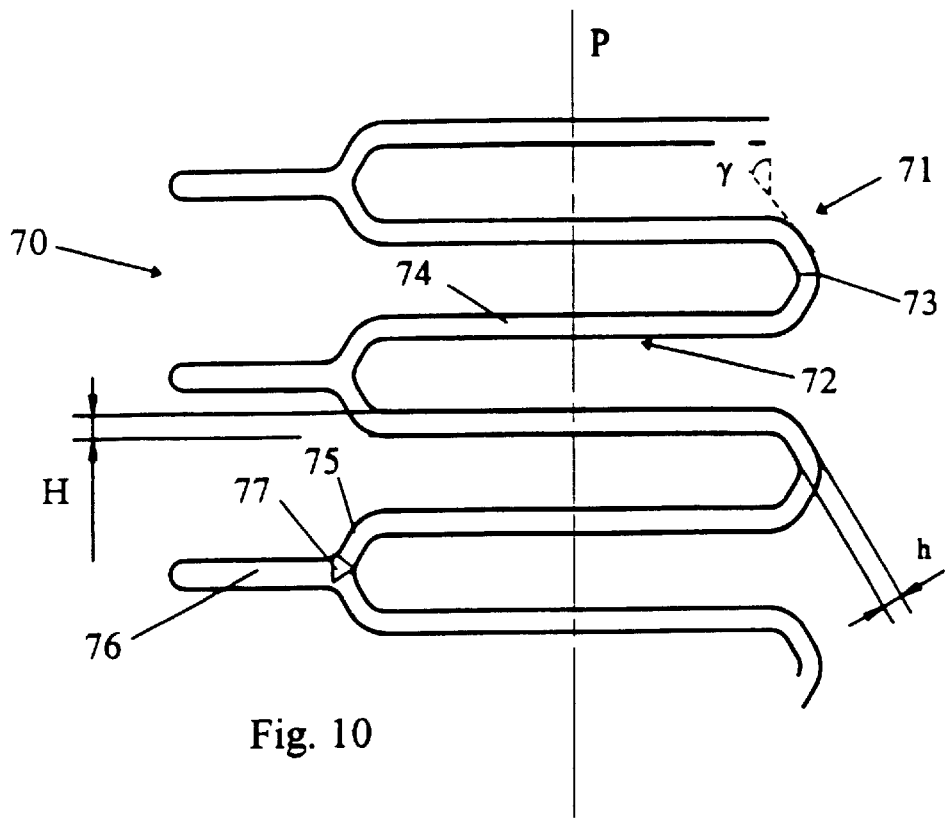
FIGS. 10 and 11, similar to FIG. 4, are respectively sections according to line AA in FIG. 1 of annular bodies according to the invention including supporting elements, the partitions of which are of variable thickness and having axial supporting walls.

FIG. 10 shows another variant embodiment, annular body 70 and supporting element 71.

Supporting element 71 comprises partitions 72 having axially oriented central portions 74 which are extended on each side by lateral end 75, which exhibits orientation γ approaching 30 degrees relative to the circumferential direction.

On one side of annular body 70, joining elements 73 are reduced to the contact surface between two adjacent lateral ends 75. On the other side, annular body 70 comprises lateral walls 76 which support joining elements 77 on this side, the joining elements being of a substantially triangular shape.

It will be noted that on this latter side, the compressive stiffness of the supporting element is greater.

The length of lateral walls 76 is, in particular, less than half the length of central portions 74 of partitions 72, so that they are not liable to buckle.

The side of supporting element 71 having the highest radial compressive stiffness should preferably be arranged on the interior side of the vehicle. It has, in fact, been observed that the loads are highest on this interior side of the vehicle.

Partitions 72 have a thickness H in their central portion 74 which is greater than thickness h of their lateral portions 75, so as to increase the buckling resistance of central portion 74.

Figure 11:
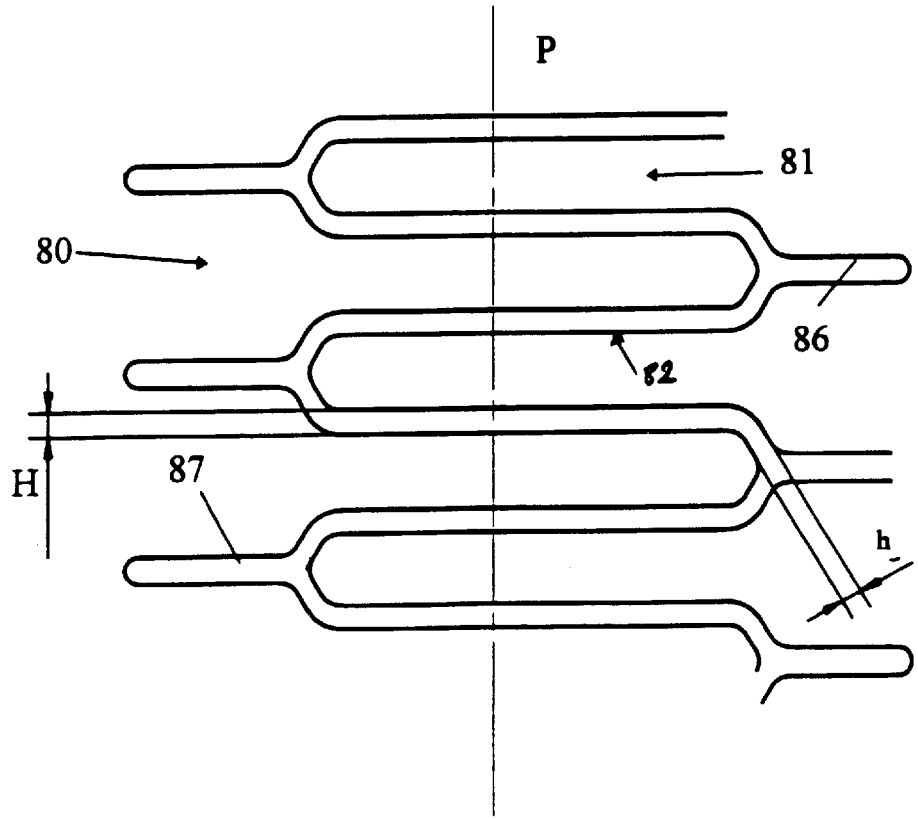

FIG. 11 shows another variant embodiment, annular body 80, a variant very similar to annular body 70 of FIG. 10.

Annular body 80 comprises axial lateral walls 86 and 87 which support supporting element 81 on both sides the supporting element 81 also being structurally similar to supporting element 71 of FIG. 10.

For a given width of annular body 80, lateral walls 86 and 87 exhibit the advantage of reducing the axial width of partitions 82 of continuous supporting element 81 and thus of improving the buckling resistance of the overall structure. The axial lengths of walls 86 and 87 may differ, as illustrated in FIG. 11.

Figure 12:
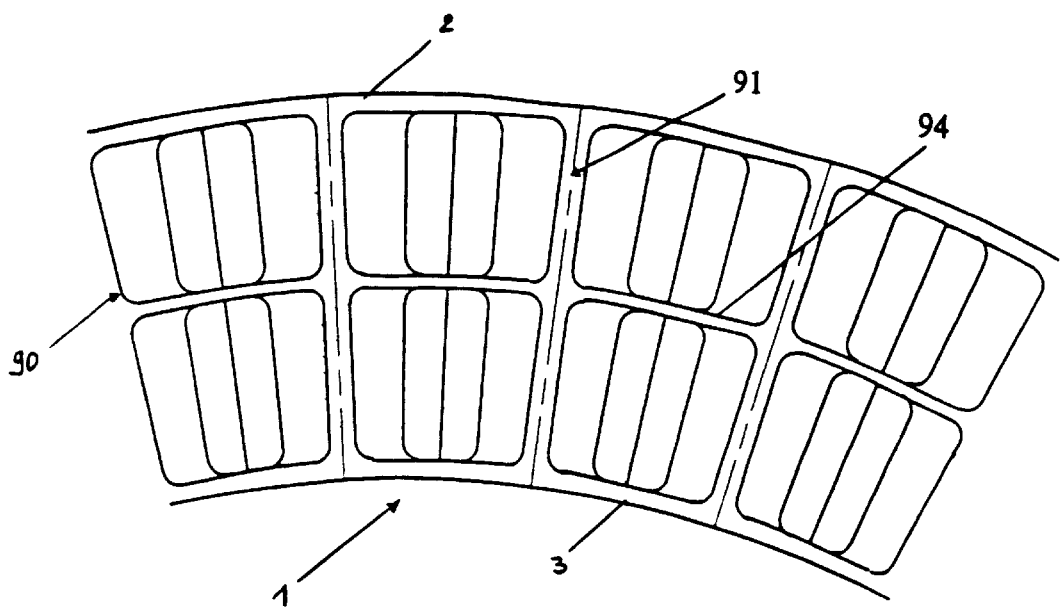
FIG. 12 is a side view of a support according to said second embodiment of the invention, the annular body of which comprises a central web.

FIG. 12 shows an axial view of a support 1 including a supporting element 91, analogous to the supporting element of FIG. 11, but additionally comprising circumferential web 94, which is arranged at half height of annular body 90. Circumferential web 94, of cylindrical shape, provides the advantage of bringing about a very substantial increase, of the order of a factor of four, in the limit buckling load of the structure of support 1.

Each of the supports 1 described with reference to FIGS. 4 to 12 exhibits the following dimensional characteristics.

There are 40 partitions (designated 12 . . . 92 in FIGS. 4 to 12, respectively) around the circumference of each support 1. Each partition exhibits a thickness of 8 mm and they are 40 mm apart. As stated above, each tested support 1 exhibits a width of 135 mm, a diameter of 440 mm and a height of 50 mm.

Furthermore, base 2 and crown 3 of support 1 exhibit a thickness of 6 mm and 7 mm, respectively.

All supporting elements (designated 7, 11 . . . 91 in the Figures) and annular bodies (designated 4, 10 . . . 90 in the Figures) may be manufactured from the vulcanized rubber composition of the invention by molding techniques. In order to facilitate axial demolding, they preferably comprise no undercut portions.

It will be noted that it would also be possible to use, as a support architecture according to the invention, a support having two or more rings connected together in the axial direction of the support, the overall structure thereof remaining unchanged.

It could, for example, be possible to provide for such a support a first ring having a substantially rectangular axial section, and one or more annular elements comprising a plurality of recesses and extending substantially axially across the entire width thereof and distributed substantially regularly around the circumference thereof.

Such a ring-type support is easier to introduce into a tire, due to the lower flexural rigidity of the various annular elements thereof.

We claim:

1. A rubber composition which, when vulcanized, is usable in a safety support for mounting on a wheel rim inside a tire, the composition comprising:
   (a) natural rubber or synthetic polyisoprene in an amount of greater than or equal to 60 parts by weight per 100 parts of diene elastomer (phr),
   (b) greater than 60 phr of a reinforcing white filler, and
   (c) from 3 to 8 phr of sulphur.

2. The rubber composition of claim 1, wherein the reinforcing white filler is silica in an amount ranging from greater than 60 phr to less than or equal to 80 phr.

3. The rubber composition of claim 2, wherein the silica has BET or CTAB surface area values which are both in a range from 50 $m^2/g$ to 200 $m^2/g$.

4. The rubber composition of claim 3, wherein the silica has BET or CTAB surface area values which are both in a range from 110 $m^2/g$ to 200 $m^2/g$.

5. The rubber composition of claim 1, further comprising a polysulphurized alkoxysilane bonding agent for coupling the reinforcing white filler to the elastomer.

6. The rubber composition of claim 1, further comprising a homopolymer obtained by polymerizing a conjugated diene monomer having 4 to 12 carbon atoms or a copolymer obtained by copolymerizing one or more conjugated dienes with each other or with one or more vinyl aromatic compounds having from 8 to 20 carbon atoms, the homopolymer or copolymer being present in an amount of less than or equal to 40 phr.

7. The rubber composition of claim 6, which comprises a blend of natural rubber and polybutadiene.

8. The rubber composition of claim 1, which comprises a single diene elastomer selected from natural rubber and synthetic polyisoprene.

9. The rubber composition of claim 1, wherein the composition exhibits an M10 elasticity modulus at 10% deformation which is greater than 10 MPa.

* * * * *

UNITED STATES PATENT AND TRADEMARK OFFICE
CERTIFICATE OF CORRECTION

PATENT NO. : 6,667,361 B2
DATED : December 23, 2003
INVENTOR(S) : Francois Masson et al.

It is certified that error appears in the above-identified patent and that said Letters Patent is hereby corrected as shown below:

Title page,
Item [73], Assignee, "Grages-Paccot (CH)" should read -- Grasnges-Paccot (CH) --.

Column 2,
Line 58, "is a" (second occurrence) should be deleted; and
Line 59, "diene elastomer" should be deleted.

Column 7,
Line 9, "variation cc" should read -- variation α --.

Column 13,
Line 36, "sides the" should read -- sides, the --.

Signed and Sealed this

Thirteenth Day of July, 2004

JON W. DUDAS
*Acting Director of the United States Patent and Trademark Office*